(12) United States Patent
Terasawa et al.

(10) Patent No.: US 7,759,409 B2
(45) Date of Patent: Jul. 20, 2010

(54) SYNTHETIC BOARD

(75) Inventors: Isamu Terasawa, Toyota (JP); Kazunori Tsuneoka, Obu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/882,298

(22) Filed: Jul. 31, 2007

(65) Prior Publication Data

US 2008/0032125 A1 Feb. 7, 2008

(30) Foreign Application Priority Data

Jul. 31, 2006 (JP) ............ P.2006-208267

(51) Int. Cl.
C08J 9/32 (2006.01)
(52) U.S. Cl. ........................ 523/118; 428/339
(58) Field of Classification Search ............ 523/218
See application file for complete search history.

(56) References Cited

U.S. PATENT DOCUMENTS

| 5,536,756 | A | * | 7/1996 | Kida et al. ............ 521/56 |
| 5,869,173 | A | * | 2/1999 | Zheng et al. ............ 428/313.3 |
| 7,037,865 | B1 | * | 5/2006 | Kimberly ............ 442/181 |
| 2007/0100051 | A1 | * | 5/2007 | Takagi ............ 524/442 |

FOREIGN PATENT DOCUMENTS

| EP | 0 308 074 | * | 3/1989 |
| GB | 2251002 A | * | 6/1992 |
| JP | 62-253447 A | | 11/1987 |
| JP | 9-39127 A | | 2/1997 |
| JP | 2002-127114 A | | 5/2002 |
| JP | 2003-165844 A | | 6/2003 |
| JP | 2005076025 A | * | 3/2005 |
| JP | 2005-262559 A | | 9/2005 |
| JP | 2005-343045 A | | 12/2005 |
| WO | WO 2005/012399 | * | 2/2005 |

OTHER PUBLICATIONS

Machine translation of document N above.*
3M Scotchlite(TM) Glass Bubbles: Product Brochure, Dec. 2003.*
Lee et al, Biodegradable polymers/bamboo fiber biocomposite with bio-based coupling agent, Composites, Part A 37 (2006), pp. 80-90) Jan. 2006.*
Derwent Abstract of WO 2005/012399, May 2005.*

* cited by examiner

Primary Examiner—Vasu Jagannathan
Assistant Examiner—Doris L Lee
(74) Attorney, Agent, or Firm—Birch, Stewart, Kolasch & Birch, LLP (57) ABSTRACT

In a synthetic board, includes a fibrous lignocellulose-based material, a resinous material and a micro hollow material. The lignocellulose-based material has an average fiber length ranging from 0.05 mm to 300 mm and an average fiber width ranging from 0.05 mm to 2 mm. The resinous material includes at least one of polybutylene succinate-based resin and polylactic-based resin. The micro hollow material has an average particle size ranging from 1 μm to 3000 μm.

10 Claims, 2 Drawing Sheets

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Appearance and Design | good | good | good | good | poor | poor | poor | good |
| Average Specific Gravity | 0.92 | 0.84 | 0.80 | 0.40 | not measuable (because of local bubbling) | 0.64 | 1.20 | 1.00 |
| Stability of Molding (stability of foamed state) | good | good | good | good | significant local fluctuation | fluctuation present | fluctuation present | poor |

SYNTHETIC BOARD

BACKGROUND OF THE INVENTION

1. Field of the Invention

The present invention relates to a synthetic board utilizing a plant-origin material, adapted for use as an interior board of a vehicle.

An ordinary synthetic board, utilized as an interior member of a vehicle or a construction member, has been prepared by mixing a phenolic resin as an adhesive material in wood chips.

2. Description of the Related Art

However, because of the recent strong demand for the use of materials having little detrimental effects on the global environment, technologies are being developed for preparing a synthetic board, without relying on the material originated from petroleum (petroleum-origin material) such as the phenolic resin. One of the technologies for preparing a synthetic board without relying on the petroleum-origin material is disclosed in Japanese Patent Publication No. 9-39127A.

However, a synthetic board, prepared from a material originated from plants (plant-origin material), involves a drawback of having a high specific gravity.

A high specific gravity of the synthetic board leads to various drawbacks. For example, a synthetic board of such high specific gravity, when employed in a head lining member, which serves to form an internal face of a ceiling of a vehicle, leads to a situation that the head lining is bent by the weight thereof.

Also such synthetic board of a high specific gravity, when utilized as a panel (door panel) constituting an internal face of a door of a vehicle, is less liable to cause the drawback of bending by the weight thereof, but increases the weight of the vehicle, thereby deteriorating the fuel economy.

Also the synthetic board with an increased specific gravity results in an increased labor power required for transportation. Therefore, the development of a synthetic board, that is formed by a material less detrimental to the global environment and that has a lower specific gravity, is being demanded not only in the vehicle assembling sites but also in construction sites and the like.

SUMMARY

It is therefore one advantageous aspect of the invention to provide a synthetic board, that is made lighter while utilizing a material less detrimental to the global environment.

According to one aspect of the invention, there is provided a synthetic board, comprising:

a fibrous lignocellulose-based material having an average fiber length ranging from 0.05 mm to 300 mm and an average fiber width ranging from 0.05 mm to 2 mm; and a resinous material including at least one of polybutylene succinate-based resin and polylactic-based resin; and a micro hollow material having an average particle size ranging from 1 μm to 3000 μm.

With this configuration, it is capable of achieving a lighter weight and securing a necessary rigidity while utilizing a material less detrimental to the global environment, thereby increasing the applicability in general purposes.

BRIEF DESCRIPTION OF THE DRAWINGS

The present invention will become more fully understand from the detailed description given hereinbelow and the accompanying drawings which are given by way of illustration only, and thus are not limitative of the present invention, and wherein.

DETAILED DESCRIPTION OF THE INVENTION

Exemplified embodiments of the present invention will be described below in detail.

In the following description, a repeating unit of a polymer, derived from a raw material monomer, may be represented by a compound name of the raw material monomer, with a word "component" attached thereto. For example, a repeating unit derived from succinic acid is represented as "succinic acid component".

Also a value defined by a work "average" means an arithmetic average, unless specified otherwise.

I. Resinous Material

I-A) Polybutylene Succinate-based Resin (Polysuccinic Acid Resin) Material

Polybutylene succinate-based resin to be employed in the synthetic board of the present invention is not particularly restricted, but is normally one defined as follows.

I-A-a: Structure

The polybutylene succinate-based resin has a structure in which 1,4-butanediol and succinic acid are alternately bonded by ester bonds. Also a raw material monomer, other than 1,4-butanediol and succinic acid, may be copolymerized. Examples of the raw material monomer, other than 1,4-butanediol and succinic acid, include lactic acid and an isocyanate.

I-A-b: Availability

The polybutylene succinate-based resin to be employed in the present invention may be a commercially available product or may be a synthesized product.

Examples of the commercially available polybutylene succinate-based resin include GS Pla (trade name), manufactured by Mitsubishi Chemical Corporation, and Bionolle 1000 series (trade name), manufactured by Showa Highpolymer Co., Ltd. Either of these substances may be usable, but GS Pla (trade name) is preferable because it is produced from plant-origin succinic acid.

In a case of synthesizing polybutylene succinate-based resin, the method therefor is not particularly restricted, but it can generally be synthesized by an ester polymerization reaction of 1,4-butanediol, succinic acid, and another monomer component to be employed when necessitated.

In the present invention, the polybutylene succinate-based resin may be employed in one kind only, or in two or more kinds in an arbitrary combination with an arbitrary ratio.

I-B) Polylactic Acid-based Resin Material

The polylactic acid-based resin material, to be employed in the synthetic board of the present invention, is not particularly restricted, but is normally one defined as follows.

I-B-a: Availability

The polylactic acid-based resin to be employed in the present invention may be a commercially available product or may be a synthesized product.

Examples of the commercially available polylactic acid-based resin include Nature Works (trade name), manufactured by Nature Works Co., Ltd. and Lacia (trade name), manufactured by Mitsui Chemicals, Inc.

In the present invention, the polylactic acid-based resin may be employed in one kind only, or in two or more kinds in an arbitrary combination with an arbitrary ratio.

II. Resinous Material

The resinous material to be employed in the synthetic board of the present invention includes at least either of polybutylene succinate-based resin and polylactic acid-based resin described above. In this case, either one alone of the polybutylene succinate-based resin and polylactic acid-based resin may be used, or both thereof may be used in a blend. It is also possible to regulate the rigidity of the synthetic board to be formed by a change in the blending amounts.

II-a: Properties

The resinous material to be employed in the synthetic board of the present invention may be either liquid or solid. It may also be dissolved or dispersed in a solvent. It may be used in any of an emulsion, a solution, a fiber and a powder.

The resinous material, used in a state of an emulsion or a solution, provides an advantage that a blended material can be formed by a spray blending method to be described later. Also the resinous material, used in a state of a fiber or a powder, provides an advantage that a blended material can be formed by a mechanical blending method to be described later.

In a case of utilizing the resin in a fiber state, the average fiber length is preferably selected equal to or larger than 5 mm and equal to or smaller than 102 mm.

More specifically, in a case of forming a blended material by an air-based mixer in the mechanical blending method (to be described later), the resin preferably has an average fiber length ranging from 5 to 15 mm.

In a case of forming a blended material by an air-based shoddy machine in the mechanical blending method, the resin preferably has an average fiber length ranging from 15 to 102 mm.

The resin has an average fiber diameter normally of 2 dtex or larger, preferably 5 dtex or larger and more preferably 10 dtex or larger, and normally of 100 dtex or smaller, preferably 80 dtex or smaller and more preferably 50 dtex or smaller.

The resin of such fibrous state provides an advantage of being efficiently mixed with the lignocellulose-based material to be described later.

In a case of employing the resin in a powder form, it preferably has an average particle size ranging from 1 μm to 3,000 μm.

The resin of such powder state provides an advantage of being efficiently mixed with the lignocellulose-based material to be described later.

II-b: Other Properties

The resin is preferably subjected to a terminal sealing treatment or the like, in order to suppress the hydrolysable property and the biodegradability. More specifically, the resin can be considered to have sufficient resistances to the hydrolysis and the biodegradation, when it has, after being let to stand in an environment of 50° C. and 90% RH for 480 hours, a tensile breaking elongation equal to or larger than 80% of the initial value.

III. Lignocellulose-based Material

The lignocellulose-based material to be employed in the synthetic board of the present invention is not particularly restricted in its type, but is normally one defined as follows. The lignocellulose-based material means a tree or a herb principally constituted of lignin, cellulose and hemicellulose.

III-a: Properties

The lignocellulose-based material, to be employed in the synthetic board of the present invention, is a plant material such as bamboo, kenaf or hemp, turned into fibers. The lignocellulose-based material may be employed in one kind only, or in two or more kinds in an arbitrary combination with an arbitrary ratio.

Also the lignocellulose-based material may be turned into fibers by any method, for example by a mechanical method utilizing a shoddy machine or an alkali treatment method of immersing the lignocellulose-based material in an aqueous alkali solution, or by various other methods such as steaming treatment or explosion treatment.

Such lignocellulose-based material of one kind or two or more kinds, turned into fibers, is made to have an average fiber length of normally 0.05 mm or longer, preferably 1 mm or longer and more preferably 10 mm or longer, and normally 300 mm or shorter, preferably 200 mm or shorter and more preferably 90 mm or shorter.

Also the lignocellulose-based material, turned into fibers, is made to have an average fiber diameter normally of 0.05 mm or larger, preferably 0.1 mm or larger and normally 2 mm or smaller, preferably 1.6 mm or smaller.

IV. Micro Hollow Material

The micro hollow material to be employed in the synthetic board of the present invention is not particularly restricted in its type, but is normally one defined as follows.

IV-a: Structure and Availability

The micro hollow material to be employed in the present invention is either a material of which a shell is formed by an inorganic substance, or a material of which a shell is formed by a thermoplastic resin and which incorporates a low-boiling hydrocarbon in the shell.

The micro hollow material, formed by an inorganic substance, being not liable to be crushed at the pressing work under heating and capable of securely maintaining the hollow structure, provides an advantage of securely realizing a weight reduction.

The material, of which a shell is formed by a thermoplastic resin and which incorporates a low-boiling hydrocarbon in the shell, is crushed at the pressing work under heating to release the hydrocarbon gas from the shell to form a bubble, thereby efficiently realizing a weight reduction.

Specific examples of the thermoplastic resin include a vinylidene chloride-acryl copolymer and an acrylic copolymer. Also an example of the gas incorporated in the micro hollow material is a hydrocarbon, represented by isobutane. More specifically, there is employed either one of:

(a) micro hollow material formed from a glass material (glass balloon);
(b) micro hollow material formed from a volcanic ash (Shiras balloon);
(c) micro hollow material formed from an alumina-silicate-based material (alumina-silicate-based balloon); and
(d) micro hollow material formed from a polymer (polymer microballoon).

Now examples of commercial products applicable to the present invention will be shown in the following:

(a) Glass balloon:
   Trade name:
   Scotchlite Glass Bubbles (manufacturer: Sumitomo 3M Limited)
   Type: K37
   True density: 0.37 g/cm$^3$
   Bulk density: 0.23 g/cm$^3$
   Fill rate (bulk density/real density): 62%
   Average particle size: 40 μm (b) Shiras balloon:
   Trade name: Sirax Balloon (manufacturer: Asama Keiseki Co., Ltd.)
   Type: PB-05
   True density: 0.9-1.1 g/cm$^3$
   Bulk density: 0.32-0.35 g/cm$^3$
   Fill rate (bulk density/real density): 29-38%
   Average particle size: 40 μm (c) Alumina-silicate balloon:
   Trade name: Fly Ash Balloon (manufacturer: Tokai Kogyo Co., Ltd.)
   Type: TF50
   True density: 0.7-0.9 g/cm$^3$
   Average particle size: 150 μm (d) Polymer balloon:
   Trade name:
   Matsumoto Microsphere (manufacturer: Matsumoto Yushi-Seiyaku Co.)
   Type: F 36-D
   Average particle size: 5-15 μm IV-b: Particle Size An average particle size of the micro hollow material, to be employed in the present invention, is selected normally as 1 μm or larger, preferably 5 μm or larger, and normally as 3,000 μm or less.

The micro hollow material, when having an excessively small average particle size, results in a situation where it drops off from the cushion-like fiber network, formed by an assembly of the fibers of the lignocellulose-based material, and it cannot be mixed properly but becomes separated. On the other hand, the micro hollow material, when having an excessively large average particle size, leads to a situation where the bubbles are too coarse thereby deteriorating the strength of the synthetic board.

IV-c: Shell Shape

The micro hollow material to be employed in the present invention is not particularly restricted in a granular shape thereof. For example, Scotchlite Glass Bubbles (trade name), Fly Ash Balloon (trade name) and Matsumoto Microsphere (trade name) above have a substantially spherical shell, while Sirax Balloon (trade name) has a shell having surface irregularities.

V. Synthetic Board

The synthetic board of the present invention, so far as containing the lignocellulose-based material, the resinous material and the micro hollow material described above, has no other particular restriction, but preferably has following characteristics.

V-a: Proportion of Resinous Material and Lignocellulose-based Material

A weight ratio of the lignocellulose-based material, with respect to the total weight of the resinous material, is selected normally as 20 wt % or more, preferably 30 wt % or more, and normally as 80 wt % or less, preferably 70 wt % or less.

An excessively low weight ratio of the lignocellulose-based material results in a situation incapable of securing a rigidity and a strength necessary for the synthetic board, and an excessively high weight ratio of the lignocellulose-based material results in a situation where the weight ratio of polybutylene succinate-based resin material or polylactic acid-based resin material as the binder is lowered in relative manner to reduce the adhesive property to the lignocellulose-based material, thus again incapable of incapable of securing a rigidity and a strength necessary for the synthetic board.

V-b: Proportion of Lignocellulose-based Material, Resinous Material and Micro Hollow Material A weight ratio of the micro hollow material, with respect to the total weight of the lignocellulose-based material, the resinous material and the micro hollow material, is selected normally as 1 wt % or higher, preferably 5 wt % or higher and further preferably 10 wt % or higher, and normally as 50 wt % or lower, preferably 45 wt % or lower and further preferably 40 wt % or lower.

V-c: Other Components

The synthetic board of the present invention may include other components, in addition to the lignocellulose-based material, the resinous material and the micro hollow material. Examples of other components include a colorant, a hydrolysis inhibitor (terminal sealing agent), an antioxidant, a thermal stabilizer and a light stabilizer. These materials may be employed in one kind only, or in two or more kinds in an arbitrary combination with an arbitrary ratio.

V-d: Physical Properties

In the synthetic board of the present invention, a thickness is not particularly restricted, but is normally 0.5 mm or more, preferably 1 mm or more, and normally 20 mm or less, preferably 10 mm or less.

An excessively large thickness may excessively increase the weight and the volume, thus becoming unsuitable as an automotive interior material, while an excessively small thickness may result in an insufficient strength or an insufficient rigidity.

Also a density of the synthetic board of the present invention is not particularly restricted, but is selected normally as 0.3 g/cm$^3$ or more, preferably 0.4 g/cm$^3$ or more and further preferably 0.5 g/cm³ or more, and normally as 1.2 g/cm³ or less, preferably 1.0 g/cm³ or less and further preferably 0.8 g/cm³ or less.

An excessively large density may be incapable of realizing a weight reduction in the synthetic board, thus becoming unsuitable as the automotive interior material, while an excessively small density may result in an insufficient strength or an insufficient rigidity.

V-a: Producing Method

The synthetic board of the present invention is not particularly restricted in the producing method therefor, and may be produced by an arbitrary method, but principal methods include followings.

(a) Preparation of Cushion-like Blend Material

The lignocellulose-based material, the polybutylene succinate-based resin material or polylactic acid-based resin material, and the micro hollow material are mixed by a shoddy machine or a mixing machine (for example of air type) to prepare a cushion-like blended material (mechanical blending method).

Otherwise, the lignocellulose-based material and the micro hollow material are mixed by a shoddy machine or a mixing machine to prepare a cushion material as a cushion-like intermediate product, and the polybutylene succinate-based resin material or polylactic acid-based resin material is sprayed and dried on the cushion material to prepare a cushion-like blended material (spray blending method).

Otherwise, a cushion material is prepared from the lignocellulose-based material by a shoddy machine or a mixing machine, and the polybutylene succinate-based resin material or polylactic acid-based resin material and the micro hollow material are sprayed and dried on the cushion material to prepare a cushion-like blended material (spray blending method).

Such blended material is also called a preform.

The thickness of the blended material is variable depending on various conditions, but, for a target weight of 4,000 g/m² and a target thickness of 4 mm for the synthetic board, the thickness of the blended material is preferably selected as from 70 to 90 mm.

(b) Press Molding Under Heating

The blended material above is placed in a mold of a shape corresponding to the synthetic board to be prepared, and is then subjected to a press molding under heating, whereby the polybutylene succinate-based resin material or polylactic acid-based resin material in the blended material is fused to firmly adhere the lignocellulose-based material with the polybutylene succinate-based resin material or polylactic acid-based resin material thereby providing a synthetic board in the shape of the mold.

Otherwise, the blended material above is charged in an injection compression molding machine having an orifice of a shape corresponding to the synthetic board to be formed, and the blended material, pressurized and heated, is extruded from the orifice to prepare a synthetic board.

In this operation, as the blended material contains the micro hollow material, the specific gravity of the synthetic board is appropriately reduced to achieve a weight reduction in the synthetic board.

The heated press molding utilizing the mold (molding method) has an advantage that the synthetic board can be prepared inexpensively with a simple facility.

On the other hand, in the method of utilizing the injection compression molding machine, the lignocellulose-based material, the resinous material and the micro hollow material have to be kneaded in advance by an extruder. This method can produce the synthetic board in continuous manner, merely by forming thus blended material into pellets and charging the pellets into the injection compression molding machine, and provides an advantage that the synthetic board can be produced in a large amount.

(c) Adhesion of Cloth

By executing the molding operation with a non-woven or woven cloth placed on the surface of the blended material, the polybutylene succinate-based resin material or polylactic acid-based resin material contained in the blended material is fused to adhere the non-woven or woven cloth with the blended material, thereby producing a synthetic board having a satisfactory design by the adhesion of the non-woven or woven cloth.

Otherwise, in the molding operation of the blended material, at first the blended material is subjected to a heat press molding under a high pressure, then a non-woven or woven cloth is placed on the blended material after the heat press molding, and the blended material with the non-woven or woven cloth placed thereon is subjected to a heat press molding under a low pressure, thereby producing a synthetic board having a satisfactory design by the adhesion of the non-woven or woven cloth.

The heat press molding is executed under a low pressure in order to prevent an excessive crushing of the non-woven or woven cloth, thereby improving the design.

In a case of preparing the synthetic board of satisfactory design, a petroleum-origin adhesive is unnecessary and the polybutylene succinate-based resin material or polylactic acid-based resin material, which is a plant-origin component contained in the blended material, is utilized to achieve an improvement in the operation efficiency while contributing to the protection of global environment.

The weight, in a case of a non-woven cloth, is preferably from 100 to 200 g/m², and, in a case of a woven cloth, is preferably about 300 g/m². Also the non-woven cloth is preferably formed by PET (polyethylene terephthalate). In the case that a design is not required for the synthetic board, such adhesion of non-woven or woven cloth is unnecessary.

VI. Specific Examples of Application

The synthetic board of the present invention thus prepared is not particularly restricted in the application thereof, but an example will be shown in the following.

Figure 1:
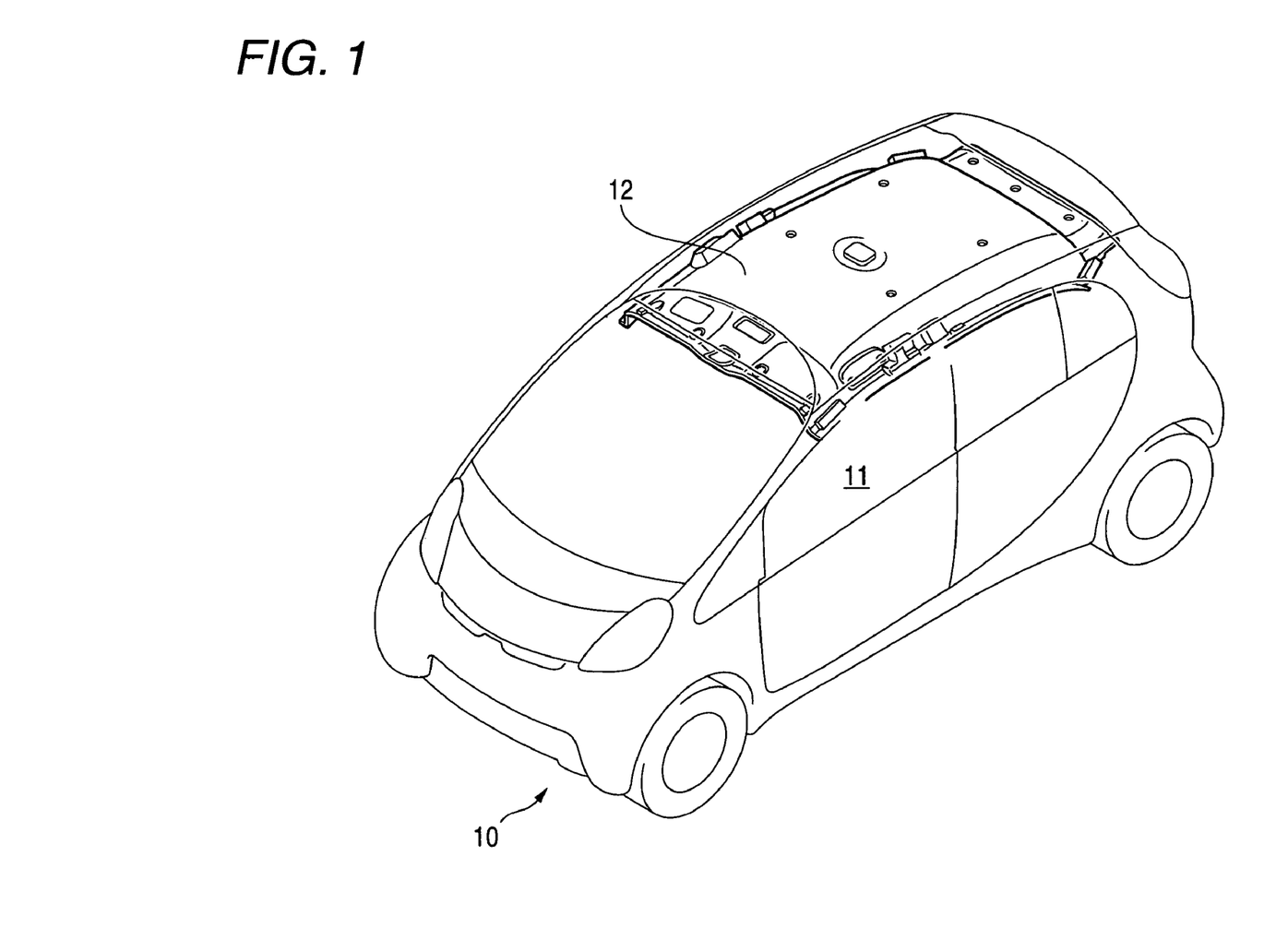
FIG. 1 is a perspective view of a vehicle provided with an interior material formed by a synthetic board according to one embodiment of the invention.

As illustrated in FIG. 1, in a vehicle 10, a ceiling of a room 11 is equipped with an interior material constituting a head lining 12.

The head lining 12, when produced by a plant-origin material, can contribute to the protection of global environment.

The head lining 12, when constituted of the synthetic board of the invention having a reduced weight, can reduce the weight of the vehicle 10 thereby improving the fuel economy, and can avoid a situation where the head lining 12 hangs down by the weight thereof.

Also the head lining 12, when constituted of the synthetic board of the invention having a reduced weight, can lower the position of the center of gravity of the vehicle 10, thus providing an advantage of improving the drivability.

VI-A) Examples

In the following, the present invention will be further clarified by examples, but the present invention is not limited to the description of the following examples so far as it does not go beyond the scope of the invention.

Figure 2:
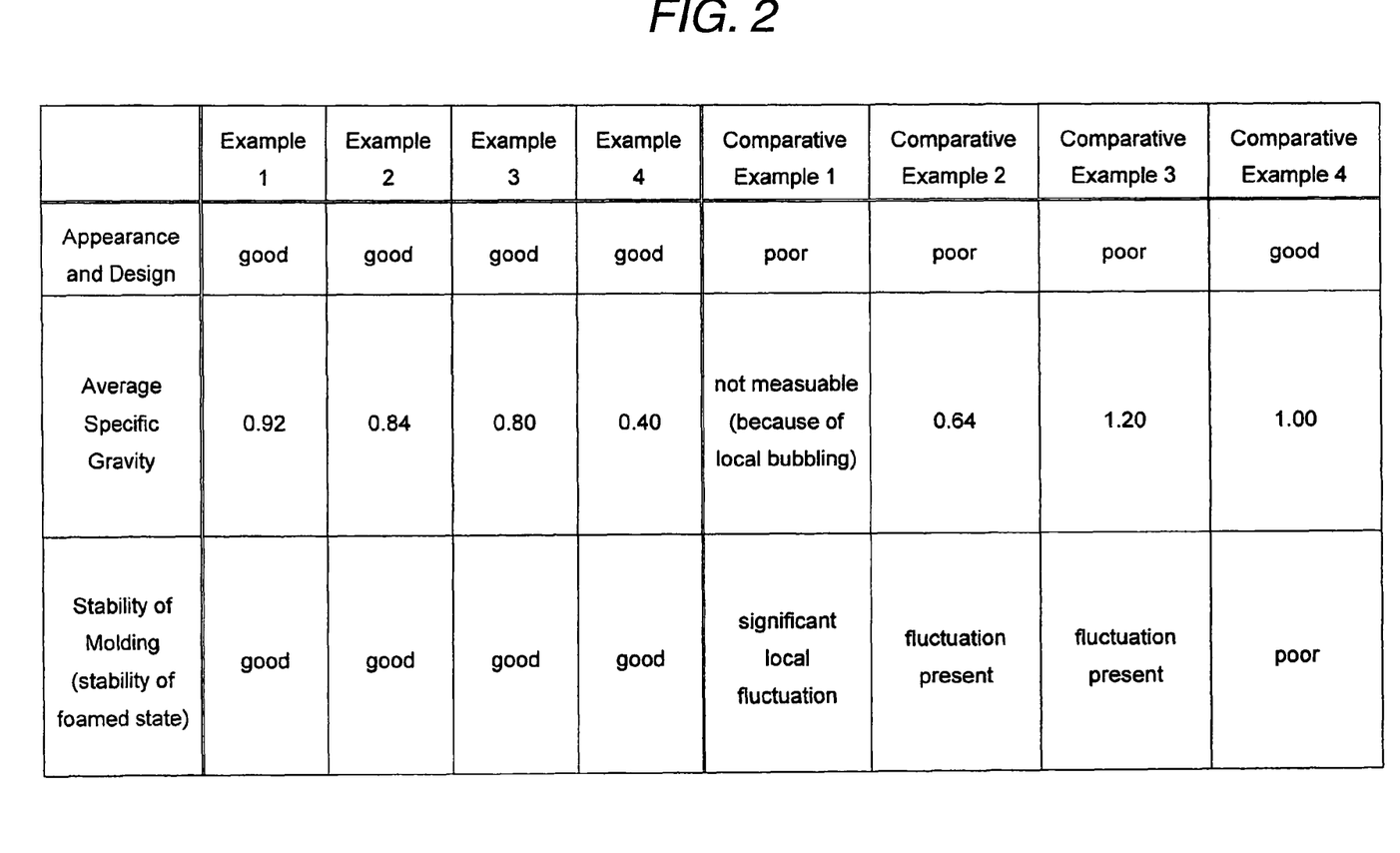
FIG. 2 is a table showing physical properties of examples for the synthetic board.

A table shown in FIG. 2 indicates physical properties in Examples 1 to 4 and Comparative Examples 1 to 4 to be explained later.

"Appearance and Design" were judged by visual observation of the present inventors, and the judgment was made with emphasis on points whether the synthetic board shows an unnatural color on the surface and shows unnatural bubbles or irregularities on the surface.

"Average Specific Gravity" was measured by taking samples from several positions of the synthetic board and utilizing a method of measuring density and specific gravity of a chemical product [JIS K 0061], a balance method.

An ordinary synthetic board, principally constituted of a phenolic resin, which is a petroleum-origin material, and wood chips, has a specific gravity of about 1.20. Therefore, in the synthetic boards of the following Examples, a specific gravity lower than 1.20 means that a weight reduction is achieved successfully.

"Stability of Molding (stability of foamed state)" was measured by measuring specific gravities of different positions. A small fluctuation in the specific gravity was evaluated as "good", and a large fluctuation in the specific gravity was evaluated as "poor". More specifically, when the minimum and maximum values of the measured specified gravities were within a range of 0.15 (+0.15), the result was judged as "good", and, when this range was exceeded, the result was judged as "poor".

VI-A-a: Example 1

A synthetic board was prepared by the following procedure, and subjected to the measurement of physical properties.

a) Lignocellulose-based Material

Bamboo was subjected to a mechanical crushing and fiber separation, and a substance having an average fiber length ranging from 10 to 90 mm and an average fiber width ranging from 0.1- to 1.6 mm was employed as the lignocellulose-based material.

b) Resinous Material

GS Pla (trade name, manufactured by Mitsubishi Chemical Corporation) was employed as a resinous material of polybutylene succinate-based resin turned into fibers. The material used had an average fiber length of 51 mm and an average fiber diameter of 13 dtex.

c) Micro Hollow Material

Scotchlite Glass Bubbles (trade name, manufactured by Sumitomo 3M Limited), type K37 was employed as the micro hollow material. The material used had an average particle size of 40 µm.

d) Blended Material

The aforementioned bamboo fibers as the lignocellulose-based material, the GS Pla as the polybutylene succinate-based resin material and the Scotchlite Glass Bubbles as the micro hollow material were blended by a shoddy machine to form a cushion-like blended material of a thickness of about 50 mm.

In this operation, the polybutylene succinate-based resin fibers were blended with a weight ratio of 40 wt % with respect to the total weight of the bamboo fibers and the polybutylene succinate-based resin fibers.

The glass balloon was blended with a weight ratio of 10 wt % with respect to the total weight of the bamboo fibers, the polybutylene succinate-based resin fibers and the glass balloon.

e) Heat Press Molding

The blended material was charged in a mold and subjected to a heat press molding.

The operation was conducted with a heating temperature of about 140° C., a pressure of about 50 kgf/cm$^2$, and a pressurizing time of about 7 minutes.

f) Evaluation of Synthetic Board

The synthetic board of the present example was satisfactory in appearance and design, and had an average specific gravity of 0.92, thus successfully achieving a weight reduction. Also the synthetic board shows little fluctuation in the specific gravity, thus judged as satisfactory also in the stability of molding.

VI-A-b: Example 2

A synthetic board was prepared by the following procedure, and subjected to the measurement of physical properties.

a) Lignocellulose-based Material

Kenaf was subjected to a mechanical crushing and fiber separation, and a substance having an average fiber length ranging from 30 to 50 mm and an average fiber width ranging from 0.1 to 1.5 mm was employed as the lignocellulose-based material.

b) Resinous Material

Nature Works (trade name, manufactured by Natural Works Co., Ltd.) was employed as a resinous material of polylactic acid-based resin turned into fibers. The material used had an average fiber length of 51 mm and an average fiber diameter of 11 dtex.

c) Micro Hollow Material

Sirax Balloon (trade name, manufactured by Asama Keiseki Co.), type PB-05 was employed as the micro hollow material. The material used had an average particle size of 40 µm.

d) Blended Material

The aforementioned kenaf as the lignocellulose-based material, the Nature Works as the polylactic acid resin material and the Sirax Balloon as the micro hollow material were blended by a shoddy machine to form a cushion-like blended material of a thickness of about 50 mm.

In this operation, the Nature Works was blended with a weight ratio of 30 wt % with respect to the total weight of the kenaf and the Nature Works (polylactic acid-based resin material).

The Sirax Balloon was blended with a weight ratio of 15 wt % with respect to the total weight of the kenaf fibers, the Nature Works and the Sirax Balloon.

e) Heat Press Molding

The blended material was charged in a mold and subjected to a heat press molding.

The operation was conducted with a heating temperature, a pressure, and a pressurizing time same as in Example 1.

f) Evaluation of Synthetic Board

The synthetic board of the present example was satisfactory in appearance and design, and had an average specific gravity of 0.84, thus successfully achieving a weight reduction. Also the synthetic board shows little fluctuation in the specific gravity, thus judged as satisfactory also in the stability of molding.

VI-A-c: Example 3

A synthetic board was prepared by the following procedure, and subjected to the measurement of physical properties.

a) Lignocellulose-based Material

Kenaf was subjected to a mechanical crushing and fiber separation, and kenaf fibers having an average fiber length ranging from 25 to 70 mm and an average fiber width ranging from 0.1 to 1.5 mm were employed as the lignocellulose-based material.

b) Polybutylene Succinate-based Resin Material

GS Pla (trade name, manufactured by Mitsubishi Chemical Corporation) was employed as a resinous material of polybutylene succinate-based resin turned into fibers. The material used had an average fiber length of 51 mm and an average fiber diameter of 13 dtex.

c) Micro Hollow Material

Fly Ash Balloon (trade name, manufactured by Tokai Kogyo Co., Ltd.), type TF-50 was employed as the micro hollow material. The Fly Ash Balloon used had an average particle size of 150 µm.

d) Blended Material

The aforementioned kenaf as the lignocellulose-based material, the Fly Ash Balloon as the polybutylene succinate-based resin material, and the Fly Ash Balloon as the micro hollow material were blended by a shoddy machine to form a cushion-like blended material of a thickness of about 50 mm.

In this operation, the GS Pla was blended with a weight ratio of 10 wt % with respect to the total weight of the kenaf and the GS Pla (polybutylene succinate-based resin material).

The Fly Ash Balloon was blended with a weight ratio of 10 wt % with respect to the total weight of the kenaf fibers, the GS Pla and the Fly Ash Balloon.

e) Heat Press Molding

The blended material was charged in a mold and subjected to a heat press molding.

The operation was conducted with a heating temperature, a pressure, and a pressurizing time same as in Examples 1 and 2.

f) Evaluation of Synthetic Board

The synthetic board of the present example was satisfactory in appearance and design, and had an average specific gravity of 0.80, thus successfully achieving a weight reduction. Also the synthetic board shows little fluctuation in the specific gravity, thus judged as satisfactory also in the stability of molding.

VI-A-d: Example 4

A synthetic board was prepared by the following procedure, and subjected to the measurement of physical properties.

a) Lignocellulose-based Material

Bamboo was subjected to a mechanical crushing and fiber separation, and a substance having an average fiber length ranging from 25 to 70 mm and an average fiber width ranging from 0.1 to 1.6 mm was employed as the lignocellulose-based material.

b) Resinous Material

GS Pla (trade name, manufactured by Mitsubishi Chemical Corporation) was employed as a resinous material of polybutylene succinate-based resin turned into fibers. The material used had an average fiber length of 51 mm and an average fiber diameter of 13 dtex.

c) Micro Hollow Material

Matsumoto Microsphere (trade name, manufactured by Matsumoto Yushi-seiyaku Co., Ltd.), type F36-D was employed as the micro hollow material. The material used had an average particle size of 5 to 15 µm.

d) Blended Material

The aforementioned bamboo as the lignocellulose-based material, the GS Pla as the polybutylene succinate-based resin material and the Matsumoto Microsphere as the micro hollow material were blended by a shoddy machine to form a cushion-like blended material of a thickness of about 50 mm.

In this operation, the GS Pla was blended with a weight ratio of 40 wt % with respect to the total weight of the bamboo and the GS Pla (polybutylene succinate-based resin material).

The Matsumoto Microsphere was blended with a weight ratio of 10 wt % with respect to the total weight of the bamboo fibers, the GS Pla and the Matsumoto Microsphere.

e) Heat Press Molding

The blended material was charged in a mold and subjected to a heat press molding.

The operation was conducted with a heating temperature, a pressure, and a pressurizing time same as in Examples 1 to 3.

f) Evaluation of Synthetic Board

The synthetic board of the present example was satisfactory in appearance and design, and had an average specific gravity of 0.80, thus successfully achieving a significant weight reduction. Also the synthetic board shows little fluctuation in the specific gravity, thus judged as satisfactory also in the stability of molding.

VI-B) Comparative Example

VI-B-a: Comparative Example 1

A synthetic board was prepared by the following procedure, and subjected to the measurement of physical properties.

a) Lignocellulose-based Material

Bamboo was subjected to a mechanical crushing and fiber separation, and a substance having an average fiber length ranging from 25 to 70 mm and an average fiber width ranging from 0.1 to 1.6 mm was employed as the lignocellulose-based material.

b) Resinous Material

GS Pla (trade name, manufactured by Mitsubishi Chemical Corporation) was employed as a resinous material of polybutylene succinate-based resin turned into fibers. The material used had an average fiber length of 51 mm and an average fiber diameter of 13 dtex.

c) Foaming Agent

As a chemical foaming agent of azo dicarbonamide type, Cellmike CAP (trade name, manufactured by Sankyo Kasei Co., Ltd.) was employed.

d) Blended Material

The aforementioned bamboo as the lignocellulose-based material, the GS Pla as the polybutylene succinate-based resin material and the Cellmike CAP as the azo dicrbonamide type chemical foaming agent were blended by a shoddy machine to form a cushion-like blended material of a thickness of about 50 mm.

In this operation, the GS Pla was blended with a weight ratio of 40 wt % with respect to the total weight of the bamboo and the GS Pla.

The Cellmike CAP was blended with a weight ratio of 3 wt % with respect to the total weight of the bamboo fibers, the GS Pla and the Cellmike CAP.

e) Heat Press Molding

The blended material was charged in a mold and subjected to a heat press molding.

The operation was conducted with a heating temperature, a pressure, and a pressurizing time same as in Examples 1 to 4.

f) Evaluation of Synthetic Board

Cellmike CAP, which is azo dicarbonamide, could not be finely and uniformly blended with the bamboo fibers and the polybutylene succinate-based resin fibers, thus generating bubbles locally.

Therefore, the appearance and design were evaluated as "poor". Because of local bubbling, the average specific gravity could not be measured. The stability of molding (foamed state) was evaluated as "poor" because of large bubbles generated locally.

VI-B-b: Comparative Example 2

A synthetic board was prepared by the following procedure, and subjected to the measurement of physical properties.

a) Lignocellulose-based Material

Bamboo was subjected to a mechanical crushing and fiber separation, and a substance having an average fiber length ranging from 25 to 70 mm and an average fiber width ranging from 0.1 to 1.6 mm was employed as the lignocellulose-based material.

b) Resinous Material

GS Pla (trade name, manufactured by Mitsubishi Chemical Corporation) was employed as a resinous material of polybutylene succinate-based resin turned into fibers. The material used had an average fiber length of 51 mm and an average fiber diameter of 13 dtex.

c) Micro Hollow Material and Foaming Agent

The micro hollow material and the foaming agent were not employed.

d) Blended Material

The aforementioned bamboo as the lignocellulose-based material, and the GS Pla as the polybutylene succinate-based resin material were blended by a shoddy machine to form a cushion-like blended material of a thickness of about 50 mm.

In this operation, the GS Pla was blended with a weight ratio of 40 wt % with respect to the total weight of the bamboo and the GS Pla (polybutylene succinate-based resin material).

e) Heat Press Molding

The blended material was charged in a mold and subjected to a heat press molding. In this operation, the pressure was selected relatively low, as 30 kgf/cm$^2$.

The operation was conducted with a heating temperature, a pressure, and a pressurizing time same as in Examples 1 to 4 and Comparative Example 1.

f) Evaluation of Synthetic Board

While the conditions above were not changed, the specific gravity of the synthetic board changed for each heat press molding. Thus observed was a phenomenon of fluctuation in the specific gravity of the synthetic board.

VI-B-c: Comparative Example 3

A synthetic board was prepared by the following procedure, and subjected to the measurement of physical properties.

a) Lignocellulose-based Material

Bamboo was subjected to a mechanical crushing and fiber separation, and a substance having an average fiber length ranging from 25 to 70 mm and an average fiber width ranging from 0.1 to 1.6 mm was employed as the lignocellulose-based material.

b) Resinous Material

GS Pla (trade name, manufactured by Mitsubishi Chemical Corporation) was employed as a resinous material of polybutylene succinate-based resin turned into fibers. The material used had an average fiber length of 51 mm and an average fiber diameter of 13 dtex.

c) Micro Hollow Material and Foaming Agent

The micro hollow material and the foaming agent were not employed.

d) Blended Material

The aforementioned bamboo as the lignocellulose-based material, and the GS Pla as the polybutylene succinate-based resin material were blended by a shoddy machine to form a cushion-like blended material of a thickness of about 50 mm.

In this operation, the GS Pla was blended with a weight ratio of 40 wt % with respect to the total weight of the bamboo and the GS Pla.

e) Heat Press Molding

The blended material was charged in a mold and subjected to a heat press molding. In this operation, the pressure was selected relatively low, as 30 kgf/cm$^2$, as in Comparative Example 2.

The operation was conducted with a heating temperature, a pressure, and a pressurizing time same as in Examples 1 to 4 and Comparative Examples 1 and 2.

f) Evaluation of Synthetic Board

While the conditions above were not changed, the specific gravity of the synthetic board changed for each heat press molding. Thus observed was a phenomenon of fluctuation in the specific gravity of the synthetic board.

The synthetic board of the present Comparative Example, though having no problem in the appearance and design, was incapable of realizing a reduction in the specific gravity.

Also the stability of molding (stability of foamed state) was evaluated as "poor", because of a large fluctuation in the specific gravity.

Thus, as indicated by this Comparative Example 3 and the foregoing Comparative Example 2, a mere reduction in the pressing pressure is incapable of attaining the necessary rigidity and strength while achieving a weight reduction, as realized in the present invention represented by Examples 1 to 4.

VI-B-d: Comparative Example 4

This example shows an example of prior synthetic boards. This synthetic board was constituted principally of a phenolic resin which is a petroleum-origin material, and wood chips.

This synthetic board, though having no problem in the appearance, design and specific gravity, cannot be considered as preferable from the standpoint of protection of global environment, in utilizing the petroleum-origin material. An appropriate weight reduction cannot be attained even by mixing a micro hollow material.

More specifically, in a synthetic board constituted of phenolic resin and wood chips, the pressure at the molding is selected high in order to prevent that a bubble of water vapor, generated from the phenolic resin (thermosetting resin) at the condensation (curing), is formed on the surface of the synthetic board.

Therefore, in the case that a micro hollow material is mixed in the phenolic resin and the wood chips, there results a situation where the shell of the micro hollow material is destructed.

Use of a micro hollow material having a hard shell is theoretically possible. However, in order to maintain the strength of the synthetic board, the amount of the phenolic resin as the binder (adhesive material) has to be increased, and such increase in the amount of the petroleum-origin material should be avoided from the standpoint of protection of the global environment.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2006-208267 filed Jul. 31, 2006 including specification, drawings and claims is incorporated herein by reference in its entirety.

What is claimed is:

1. A head lining for serving as an interior of a ceiling of a vehicle, comprising:
   a synthetic board that includes:
      a fibrous bamboo having an average fiber length ranging from 10 mm to 90 mm and an average fiber width ranging from 0.05 mm to 2 mm;
      a resinous material, including at least one of polybutylene succinate-based resin and polylactic-based resin, and including fibrous resin having an average fiber length ranging from 5 mm to 102 mm and an average fiber diameter ranging from 2 dtex to 100 dtex prior to a heat molding; and
      a micro hollow material having an average particle diameter ranging from 1 μm to 3000 μm; and
   a cloth placed on a face of the synthetic board, the face facing an inside of the vehicle.

2. The head lining as set forth in claim 1, wherein:
a weight ratio of the micro hollow material with respect to a total weight of the micro hollow material and the resinous material ranges from 1 wt % to 50 wt %.

3. The head lining as set forth in claim 1, wherein:
a weight ratio of the fibrous bamboo with respect to a total weight of the fibrous bamboo and the resinous material is ranges from 20 wt % to 80 wt %.

4. The head lining as set forth in claim 1, wherein:
the micro hollow material includes a shell comprised of an inorganic substance.

5. The head lining as set forth in claim 1, wherein:
the micro hollow material includes a shell comprised of thermoplastic resin and incorporating low-boiling hydrocarbon.

6. The head lining as set forth in claim 2, wherein:
the weight ratio of the micro hollow material with respect to the total weight of the micro hollow material and the resinous material is ranges from 10 wt % to 40 wt %.

7. The head lining as set forth in claim 1, wherein:
the weight ratio of the fibrous bamboo with respect to the total weight of the fibrous bamboo and the resinous material is ranges from 30 wt % to 70 wt %.

8. The head lining as set forth in claim 1, wherein:
the average fiber diameter of the fibrous resin ranges from 10 dtex to 50 dtex.

9. The head lining as set forth in claim 1, wherein:
a thickness of the synthetic board ranges from 0.5 mm to 20 mm.

10. The head lining as set forth in claim 1, wherein:
a density of the synthetic board ranges from 0.3 $g/cm^3$ to 1.2 $g/cm^3$.

* * * * *